United States Patent
Norton et al.

(10) Patent No.: US 11,103,955 B2
(45) Date of Patent: Aug. 31, 2021

(54) COMPONENT MANUFACTURE

(71) Applicant: Thinklaser Ltd, Redhill (GB)

(72) Inventors: Adrian Norton, Redhill (GB); Philip Harris, Redhill (GB)

(73) Assignee: Adrian Norton, Redhill (GB)

( * ) Notice: Subject to any disclaimer, the term of this patent is extended or adjusted under 35 U.S.C. 154(b) by 0 days.

(21) Appl. No.: 15/123,911

(22) PCT Filed: Feb. 11, 2015

(86) PCT No.: PCT/GB2015/000052
§ 371 (c)(1),
(2) Date: Sep. 6, 2016

(87) PCT Pub. No.: WO2015/132550
PCT Pub. Date: Sep. 11, 2015

(65) Prior Publication Data
US 2017/0014949 A1  Jan. 19, 2017

(30) Foreign Application Priority Data

Mar. 6, 2014  (GB) ...................... 1403973

(51) Int. Cl.
*B23K 26/324* (2014.01)
*B23K 26/08* (2014.01)
(Continued)

(52) U.S. Cl.
CPC ............ *B23K 26/324* (2013.01); *B22F 12/00* (2021.01); *B23K 26/0823* (2013.01);
(Continued)

(58) Field of Classification Search
CPC ........ B22F 3/105; B22F 3/1055; B23K 26/22; C22C 47/064; C22C 47/062; C22C 47/066; C22C 47/068
(Continued)

(56) References Cited

U.S. PATENT DOCUMENTS 5,968,671 A * 10/1999 Joseph ................. B23K 3/0392
428/611
6,144,008 A   11/2000 Rabinovich
(Continued)

FOREIGN PATENT DOCUMENTS

EP  1726678 A1  11/2006
EP  2223792 A1  9/2010
GB  2493398 A   2/2013

OTHER PUBLICATIONS

International Search Report and Written Opinion dated May 12, 2015 for International Application No. PCT/GB2015/000052, filed Feb. 11, 2015.
(Continued)

*Primary Examiner* — Alex M Valvis

(57) ABSTRACT

A computer-controlled method of component manufacture is disclosed, which includes winding a thread of material around a shaping element to form a first layer formed of adjacent turns of the thread. The winding is repeated to form a second layer of adjacent turns of the thread on top of the first layer. A laser beam is then applied between adjacent turns of each layer to attach them at predetermined points.

13 Claims, 4 Drawing Sheets

(51) Int. Cl.
- *B23K 26/22* (2006.01)
- *B29C 53/56* (2006.01)
- *B29C 67/00* (2017.01)
- *F01D 5/28* (2006.01)
- *F01D 5/18* (2006.01)
- *B22F 12/00* (2021.01)
- *B23K 101/06* (2006.01)
- *B23K 103/16* (2006.01)
- *C22C 29/06* (2006.01)
- *C22C 32/00* (2006.01)
- *B23K 101/00* (2006.01)
- *B22F 10/10* (2021.01)

(52) U.S. Cl.
CPC .......... *B23K 26/0869* (2013.01); *B23K 26/22* (2013.01); *B29C 53/56* (2013.01); *B29C 67/00* (2013.01); *F01D 5/18* (2013.01); *F01D 5/282* (2013.01); *B22F 10/10* (2021.01); *B23K 2101/001* (2018.08); *B23K 2101/06* (2018.08); *B23K 2103/16* (2018.08); *B23K 2103/172* (2018.08); *C22C 29/065* (2013.01); *C22C 32/0063* (2013.01); *F05D 2230/22* (2013.01); *F05D 2230/30* (2013.01); *F05D 2250/25* (2013.01); *F05D 2300/2261* (2013.01); *F05D 2300/6032* (2013.01); *Y02P 10/25* (2015.11); *Y02T 50/60* (2013.01)

(58) Field of Classification Search
USPC .......................................................... 419/4, 9
See application file for complete search history.

(56) References Cited

U.S. PATENT DOCUMENTS

| | | | |
|---|---|---|---|
| 7,987,574 B2* | 8/2011 | Franchet | B23K 11/0026 29/419.1 |
| 2002/0108932 A1 | 8/2002 | Gordon et al. | |
| 2004/0020904 A1 | 2/2004 | Andrees et al. | |
| 2005/0054950 A1 | 3/2005 | Parins | |
| 2007/0045251 A1 | 3/2007 | Franchet et al. | |
| 2010/0194003 A1* | 8/2010 | Shimogawa | H01F 17/04 264/618 |
| 2013/0340226 A1 | 12/2013 | Dambrine et al. | |
| 2014/0241871 A1* | 8/2014 | Gregory | F23R 3/14 415/208.1 |

OTHER PUBLICATIONS

United Kingdom Search Report dated Dec. 22, 2014 for United Kingdom Application No. GB1403973.9, filed Mar. 6, 2014.
United Kingdom Examination Report dated Dec. 8, 2016 for Application No. GB1403973.9, filed Mar. 6, 2014.
Communication about intention to grant a European patent No. 15710834.1-1103, dated Aug. 26, 2020, 34 pages.
Examination Report for EP Application No. 15710834.1-1103, dated Sep. 6, 2019, 5 pages.
Examination Report for UK patent application No. GB1403903.9, dated Apr. 26, 2017, 3 pages.
Examination Report for UK patent application No. GB1403973.9, dated Dec. 23, 2014, 4 pages.
Intention to Grant UK patent application No. GB1403903.9, dated Sep. 26, 2017, 2 pages.
Notification of Grant UK patent application No. GB1403903.9, dated Dec. 18, 2017, 2 pages.

* cited by examiner

COMPONENT MANUFACTURE

CROSS-REFERENCE TO RELATED APPLICATIONS

This Application is a Section 371 National Stage Application of International Application No. PCT/GB2015/000052, filed Feb. 11, 2015, which is incorporated by reference in its entirety and published as WO2015/132550 on Sep. 11, 2015.

FIELD OF THE INVENTION

This invention relates to a method and system for component manufacture, particularly a computer-controlled one employing one or more lasers.

BACKGROUND OF THE INVENTION

There is a need in certain industries for the manufacture of components with high strength and low weight. Examples include aerospace components, for example fuel tanks. Other examples include high-performance car components, turbine blades, aircraft landing gear, oil/gas tubular components and so on.

Composite materials are often used for this purpose, whether to make the entire, or a part of the, component. Components made from composite materials, particularly ones of the sort mentioned above which tend to be mission-critical with little or no room for failure, tend to be made using manual processes. It follows that the process is rather slow, has a low production rate and may produce inconsistent results.

For example, the manufacture of a tubular component of composite material will typically involve providing a shaping mandrel over or around which a substrate sheet will be wrapped manually to ensure there are no gaps. A resin is then typically applied, again manually, and some subsequent treatment process, e.g. heating or pressurisation, follows before the component can be removed from the mandrel. Multiple layers of substrate and resin may be used.

SUMMARY OF THE INVENTION

A first aspect of the invention provides a method of component manufacture, comprising: winding a thread of material around a shaping element to form a first layer formed of adjacent turns of said thread; repeating the first step to form a second layer of adjacent turns of said or a different thread on top of the first layer; and applying a laser beam between adjacent turns of each layer to attach them at predetermined points.

The method makes use of known thread-like materials which can be wound around the element, for example a mandrel, in a controlled but automated way. The method employs a laser to attach adjacent turns, whether each adjacent turn or spaced apart ones, which holds (at least temporarily) the turns closely adjacent one another on the mandrel to prevent lateral movement. More than two layers can be deposited in this way. Other treatments can be performed either during or after the depositing of layers to finish or complete the component, one example being so-called HIPing (Hot Isostatic Pressing). Given the ability to precisely control winding, and precisely control where a laser beam is directed relative to the mandrel, this enables an important part of the component manufacturing process to be performed in an automated and relatively quick manner.

The laser beam may be applied at selected predetermined points between the first and second layers to attach adjacent turns of one layer to the other. In this way, the adjacent turns of a given layer can be attached and also adjacent turns of the different layers. This provides greater stability.

The predetermined attachment points in a given layer and/or between the first and second layers may be distributed around the shaping element in a non-linear manner. In this way, rather than the attachment points for a given layer being formed side-by-side along a single axis, which may create weaknesses in the formed component, the method provides a predetermined pattern or map of non-linear laser treatment points to avoid such inherent weakness.

The second layer of adjacent turns of the thread material may be oriented differently from that of the first layer. For example, the second layer turns may be oriented at substantially 15, 30, 45 or 90 degrees to the first layer turns. This again improves strength.

The thread of material may be a matrix coated fibre material, for example Silicon Carbide surrounded by a metal material, but is not limited to such material. The metal material may be for example aluminium, titanium or steel.

The method may further comprise the step of depositing a powdered material between the first and second layers and applying a laser beam to cause melting of the powder. In this way, the small gaps between adjacent threads can be substantially filled, for example by depositing the powder before the second layer is placed over the first layer, and the laser being focused by the computer controller to momentarily heat the powder which flows into the gap. This helps avoid gaps which can weaken the component. The powdered material may be metal based.

The method may be used for the manufacture of thin wall components, e.g. tubular or hollow components.

A further aspect of the invention provides a component formed by the computer-controlled method of any preceding claim.

A further aspect provides a computer program.

It will be appreciated that, in all the above definitions, the adjacent threads may be provided in tape or sheet form and said tape or sheet wound around the shaping element prior to the laser attachment process.

BRIEF DESCRIPTION OF THE DRAWINGS

The invention will now be described by way of non-limiting example with reference to the accompanying drawings, in which.

DETAILED DESCRIPTION OF PREFERRED EMBODIMENT(S)

Embodiments described herein provide a computer-controlled system 1 for part of a component manufacturing process that involves the winding of a thread-like material, in this case matrix coated fibre (MCF), onto a shaping mandrel. In the simple example given, a tubular mandrel is used, but it will be appreciated and understood that any hollow shape can be formed and the term thin-wall construction is understood in this context. The MCF is in this case silicon carbide surrounded by a metal material outer, being any one of aluminium, titanium or steel. Again, other forms of fibre can be used.

The system 1 is arranged to accurately wind the MCF onto the mandrel in a first layer and, subsequently, in a second layer over the first layer. Further layers may be deposited in this way. As winding proceeds, the system 1 accurately fuses or bonds certain predetermined adjacent turns of the thread to ensure the closely packed turns remain static within each layer. Adjacent turns of different layers can also be fused or bonded in this way. The pattern of these 'tacks' (so-called because they are point-like) is predetermined and programmed within the computer to ensure rigidity and strength of the component when complete. In the case of MCF, the bonding occurs on the matrix material around the outside of the MCF with the inner silicon carbine 'floating'.

Figure 1:
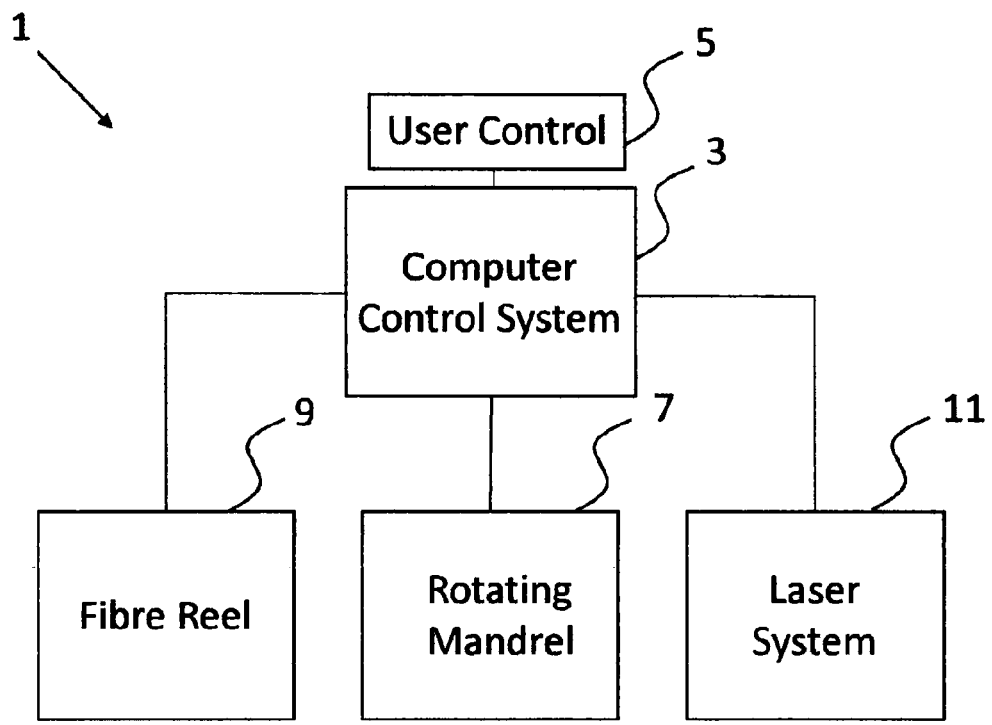
FIG. 1 is a schematic block diagram of a computer-controlled manufacturing system according to the invention.

Referring to FIG. 1, the system 1, comprises a computer control system (CCS) 3 which is akin to a computer numerical control (CNC) system in that it comprise one or more processors or microcontrollers which operate under program control to operate various hardware components of the system. The CCS 3 includes memory on which is stored the or each computer program for this purpose, although firmware may be used in addition or as an alternative. RAM is used in conjunction with the processor(s) or microcontroller(s) in the conventional way. A user control 5 module comprises input and output means through which the user can upload instructions for the CCS 3 and monitor progress, output and any system messages.

The CCS 3 controls the operation of a fibre reel 9, a rotating mandrel 7 and a laser system 11. The control of these components 9, 7, 11 is done under program control to automatically and precisely perform a manufacturing method to be explained below. It is to be understood that the manufacturing method is partial in the sense that subsequent treatments steps, e.g. HIPing may be employed to finish the component prior to use. In other embodiments, the CCS 3 does not directly control the fibre reel 9 which is simply guided and tensioned but left effectively to freely dispense the fibre as the mandrel 7 rotates. In other embodiments, the fibre reel 9 and mandrel 7 are not computer controlled, and the CCS 3 only controls the laser system 11.

Figure 2:
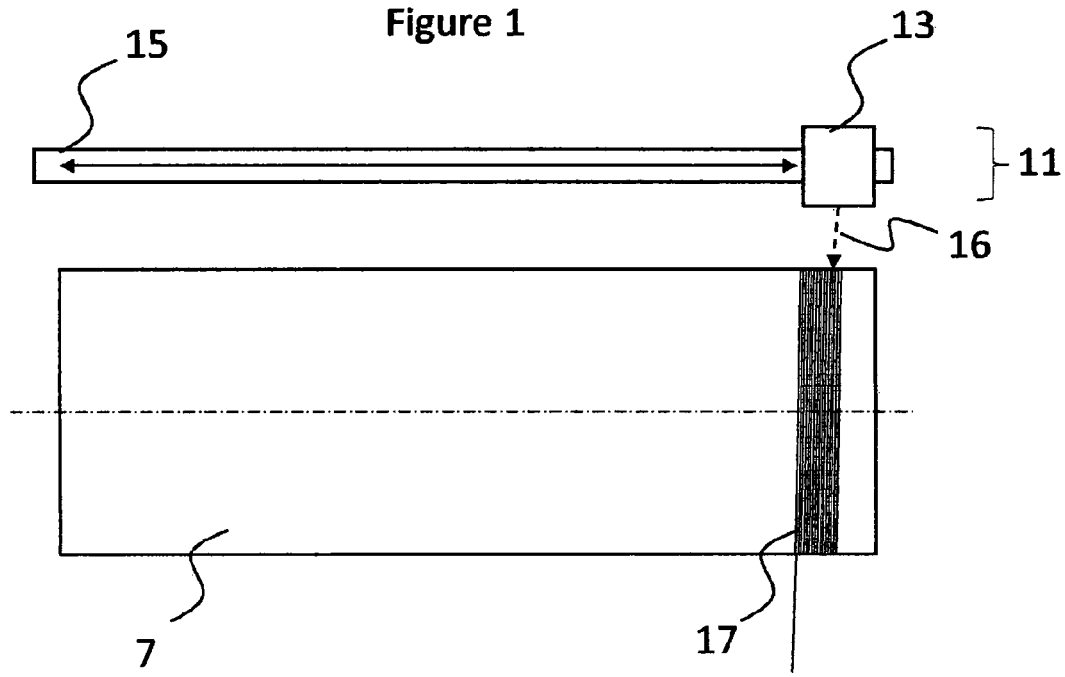
FIG. 2 is a plan-view diagram of a manufacturing system indicated by FIG. 1 following depositing of a first layer of thread material.
Figure 3:
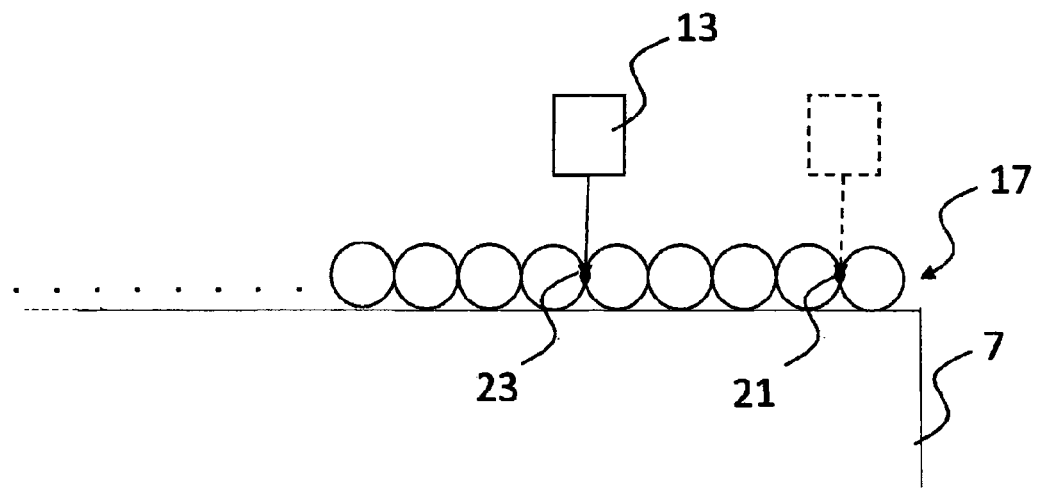
FIG. 3 is a partial, sectional-view of the FIG. 2 system.

FIG. 2 shows a cylindrical mandrel 7 from above. Alongside it is the laser system 11 which includes the laser (or more than one laser) module mounted on a movable head 13 which is moved along a horizontal track 15 according to computer control. The head 13 may move in more than one direction, but given that the mandrel 7 rotates under CCS 3 control, it is assumed in this instance one dimensional movement is sufficient. The CCS 3 determines when the laser module(s) are on/off based on position of the head 13 along the track and the relative rotational position of the mandrel 7. For more complex mandrel shapes (e.g. for domes, blades etc.) multiple axis of movement of the head 13 will be required.

A number of turns of MCF thread 17 are shown already wound on the mandrel 7.

Referring to FIGS. 2 to 5, the general method performed by the CCS 3 under program control is as follows:

1) The thread 17 is wound around the mandrel 7 to form a coil of closely-adjacent turns in a first, in this case horizontal, layer;
2) During or after the first layer is complete, the laser system 11 is operated to fuse or bond certain adjacent turns to one another in a point-like manner (see reference numerals 21, 23, 25, 27);
3) The thread 17, whether the same or a different thread, is wound around the mandrel 7 over the first layer to form a second layer of closely-adjacent turns; and
4) Stage 2 above is repeated for the second layer.

Figure 4:
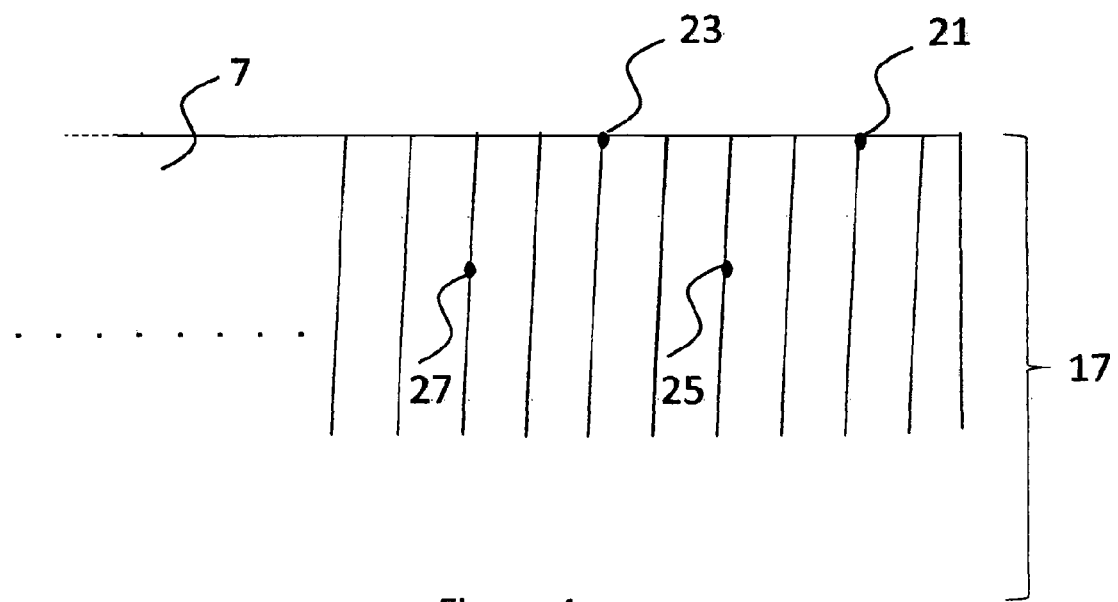
FIG. 4 is a partial close-up view of the FIG. 2 system.

As indicated in FIG. 4, which is a partial plan view, only certain adjacent turns of a given layer need be fused in this way, i.e. not all adjacent turns need be fused in this way. Also, a predetermined pattern of fuse points is employed to avoid weaknesses e.g. due to a linear side-by-side pattern of points. Here, the points are distributed in both horizontal and vertical directions.

Figure 5:
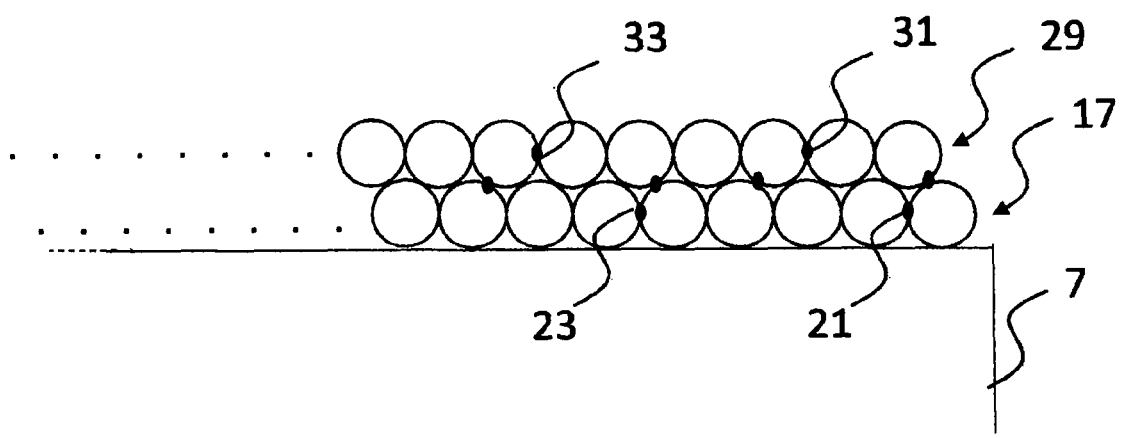
FIG. 5 is a partial, sectional-view of the FIG. 2 system following depositing of a second layer of material.

As indicated in FIG. 5, the second layer 29 preferably nests within the upper gaps of the first layer 17 to minimise the gaps in between. It is worth pointing out at this stage that the thread need not have a circular cross-section and cross-sections resulting in smaller gaps can be employed.

As also indicated in FIG. 5, certain predetermined ones of the first and second layers 17, 29 can be fused together using the same method. The laser beam is focused between the junction of the first and second layers 17, 29 for this purpose.

Figure 6:
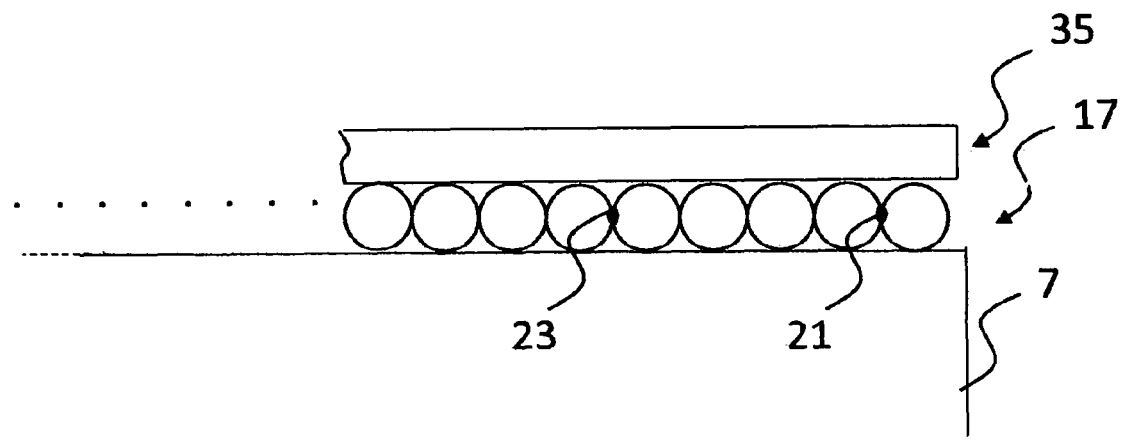
FIG. 6 is a partial, sectional-view of the FIG. 2 system following depositing of a second layer of material according to a second embodiment.

In the first example shown and described with reference to FIGS. 2 to 5, it will be noted that the orientations of the thread 17 for the first and second layers 17, 29 is the same. However, the two layers 17, 19 can be oriented differently, as indicated in FIG. 6, which is a further embodiment where the second layer 35 in this case is oriented 90 degrees relative to the underlying layer. Other orientations, for example, 15, 30, 45 degree relative orientations may be used as an alternative.

Figure 7:
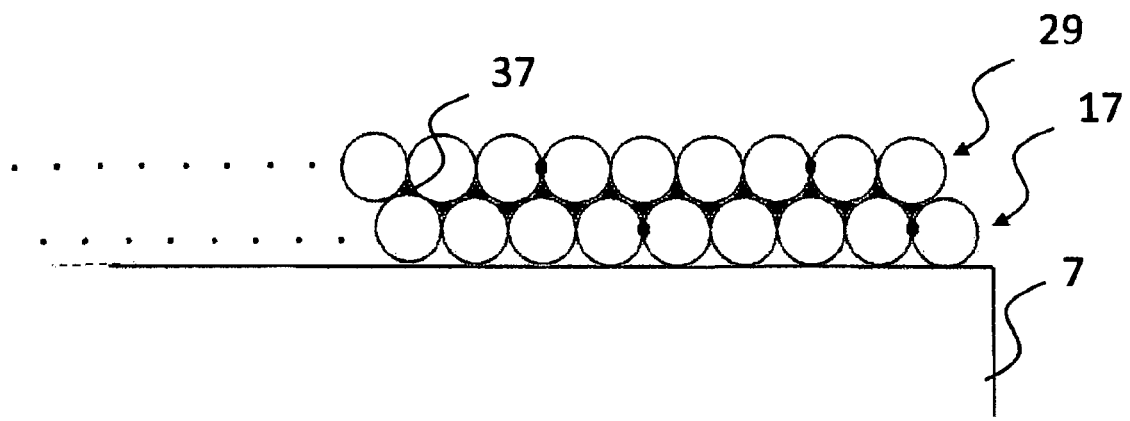
FIG. 7 is a partial, sectional view of the FIG. 2 system in which a powdered material is deposited between the first and second layers.

In a still further embodiment, represented by FIG. 7, a powdered material 7 is deposited between the first and second layers 17, 29 i.e. after the first layer is wound onto the mandrel 7. After the second layer 29 has been wound over the first layer 17 the laser 13 is controlled to heat the powdered material 37 to cause it to flow within the gaps and substantially fill said gaps to avoid subsequent points or areas of weakness. For this purpose the laser 13 is focused on this intermediate region between the layers.

As mentioned previously, one or more further layers may be wound using the above principle. When all layers are deposited, the mandrel 7 is removed using conventional techniques, e.g. using a sacrificial mandrel which is destroyed leaving the outer component. The component which is likely to be only partially finished may be moved to a subsequent stage, e.g. HIPing prior to removal of the mandrel 7.

It will be appreciated that the above described embodiments are purely illustrative and are not limiting on the scope of the invention. Other variations and modifications will be apparent to persons skilled in the art upon reading the present application.

Moreover, the disclosure of the present application should be understood to include any novel features or any novel combination of features either explicitly or implicitly disclosed herein or any generalization thereof and during the prosecution of the present application or of any application derived therefrom, new claims may be formulated to cover any such features and/or combination of such features.

The invention claimed is:

1. A method of component manufacture, comprising acts of:
   winding a thread of material around a shaping mandrel to form a first layer formed of adjacent turns of said thread;
   under computer-control, applying a laser beam between adjacent turns of the first layer to attach them at predetermined attachment points;
   repeating the winding act to form a second layer of adjacent turns of said thread on top of the first layer, wherein the second layer of adjacent turns of the thread of material is oriented differently from that of the first layer; and
   repeating the laser beam application act to the second layer,
   wherein the predetermined attachment points between adjacent turns in a given layer and/or between first and second layers are distributed around the shaping mandrel in a non-linear manner,
   applying the laser beam at selected predetermined points between the first and second layers to attach adjacent turns of one layer to another, and
   wherein the predetermined attachment points
   predetermined attachment points between adjacent turns in a given layer and predetermined attachment points between first and second layers at least one of fuse or bond only two turns.

2. The method according to claim 1, wherein the second layer turns are oriented at 90 degrees to the first layer turns.

3. The method according to claim 1, wherein the thread of material is a matrix coated fibre material.

4. The method according to claim 3, wherein the thread of material is Silicon Carbide surrounded by a metal material.

5. The method according to claim 1, further comprising depositing a powdered material between the first and second layers and applying a laser beam to cause melting of the powdered material.

6. The method according to claim 5, wherein the powdered material is metal based.

7. The method according to claim 1, wherein the winding acts each comprise winding a single thread of material around the shaping mandrel.

8. The method according to claim 1, wherein the shaping mandrel is a tubular mandrel.

9. The method according to claim 1, wherein the cross-section of the thread of material includes a non-circular cross-section.

10. The method according to claim 1, wherein at least one winding is between adjacent attachment points in the first layer.

11. The method according to claim 10, wherein at least one winding is between adjacent attachment points in the second layer.

12. A non-transitory computer-readable storage medium having stored thereon computer-readable code, which, when executed by a computing apparatus, causes the computing apparatus to perform a method comprising acts of:
   winding a thread of material around a shaping mandrel to form a first layer formed of adjacent turns of said thread;
   applying a laser beam, under computer-control, between adjacent turns of the first layer to attach them at predetermined points;
   repeating the winding act to form a second layer of adjacent turns of said thread on top of the first layer, wherein the second layer of adjacent turns of the thread of material is oriented differently from that of the first layer; and
   repeating the laser beam application act to the second layer,
   wherein the predetermined points between adjacent turns in a given layer and/or between the first and second layers are distributed around the shaping mandrel in a non-linear manner,
   applying the laser beam at selected predetermined points between the first and second layers to attach adjacent turns of one layer to another, and
   wherein the predetermined attachment points
   predetermined points between adjacent turns in a given layer and predetermined points between first and second layers at least one of fuse or bond only two turns.

13. An apparatus comprising:
   at least one processor and at least one non-transitory memory having computer-readable code stored thereon which when executed control the at least one processor to perform acts of:
   winding a thread of material around a shaping mandrel to form a first layer formed of adjacent turns of said thread;
   applying a laser beam, under computer-control, between adjacent turns of each layer to attach them at predetermined attachment points;
   winding the thread of material around the shaping mandrel to form a second layer of adjacent turns of said thread on top of the first layer, wherein the second layer of adjacent turns of the thread of material is oriented differently from that of the first layer; and
   applying a laser beam under computer-control between adjacent turns of the second layer to attach them at predetermined attachment points,
   wherein the predetermined attachment points between adjacent turns in a given layer and/or between first and second layers are distributed around the shaping mandrel in a non-linear manner,
   applying the laser beam at selected predetermined points between the first and second layers to attach adjacent turns of one layer to another, and
   wherein the predetermined attachment points
   predetermined attachment points between adjacent turns in a given layer and predetermined attachment points between first and second layers at least one of fuse or bond only two turns.

* * * * *